US010218692B2

(12) United States Patent
Gibson et al.

(10) Patent No.: US 10,218,692 B2
(45) Date of Patent: *Feb. 26, 2019

(54) MANAGEMENT OF DIGITAL CERTIFICATES

(71) Applicant: International Business Machines Corporation, Armonk, NY (US)

(72) Inventors: Robert A. Gibson, Raleigh, NC (US); J. Peter Neergaard, Pittsburgh, PA (US); William J. O'Donnell, Fichburg, WI (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/464,777

(22) Filed: Aug. 21, 2014

(65) Prior Publication Data

US 2016/0057132 A1    Feb. 25, 2016

(51) Int. Cl.
*H04L 29/06* (2006.01)
*H04L 9/32* (2006.01)

(52) U.S. Cl.
CPC ........ *H04L 63/0823* (2013.01); *H04L 9/3265* (2013.01); *H04L 63/0442* (2013.01); *H04L 63/168* (2013.01); *H04L 2209/64* (2013.01)

(58) Field of Classification Search
CPC ... H04L 9/3247; H04L 9/3263; H04L 9/3268; H04L 63/0823; H04L 9/3265; H04L 63/168; G06F 21/33
See application file for complete search history.

(56) References Cited

U.S. PATENT DOCUMENTS

| 7,315,985 | B1 * | 1/2008 | Gauvin | H04L 41/12 715/734 |
| 7,822,206 | B2 | 10/2010 | Birk et al. | |
| 8,549,300 | B1 * | 10/2013 | Kumar | H04L 9/3247 713/153 |
| 9,100,190 | B1 * | 8/2015 | Schwengler | H04L 9/3263 |

(Continued)

FOREIGN PATENT DOCUMENTS

WO    2007002691 A2    1/2007

OTHER PUBLICATIONS

Audun Jøsang et al., User Interface Requirements for Authentication of Communication, 2003, ACM, vol. 18, pp. 75-80.*

(Continued)

*Primary Examiner* — Kari L Schmidt
*Assistant Examiner* — Fahimeh Mohammadi
(74) *Attorney, Agent, or Firm* — Kelsey M. Skodje

(57) ABSTRACT

Various embodiments are directed to a computer-implemented method for displaying a map of certificate relationships. A method can include retrieving certificate information for two or more servers and storing the retrieved certificate information in a memory. In addition, the method can include receiving a command to generate a map of certificate relationships. The command includes a command scope that identifies at least a first server of the two or more servers. Further, the method can include generating the map from the retrieved certificate information and rendering the map on a display device. The map includes the first server and a device having a certificate relationship with the first server.

11 Claims, 14 Drawing Sheets

(56) References Cited

U.S. PATENT DOCUMENTS

| | | | |
|---|---|---|---|
| 2002/0059364 A1* | 5/2002 | Coulthard | G06F 21/128 709/203 |
| 2003/0014629 A1 | 1/2003 | Zuccherato | |
| 2005/0010926 A1* | 1/2005 | Narayanaswamy | G06F 8/61 719/310 |
| 2005/0154875 A1* | 7/2005 | Chao | G06F 21/445 713/156 |
| 2005/0289644 A1 | 12/2005 | Wray | |
| 2006/0069771 A1* | 3/2006 | Gissel | H04L 69/40 709/224 |
| 2007/0118892 A1* | 5/2007 | Sastry | H04L 63/0823 726/10 |
| 2008/0127050 A1* | 5/2008 | Wang | G06F 8/10 717/105 |
| 2009/0119255 A1* | 5/2009 | Frank | G06F 17/3087 |
| 2010/0257358 A1* | 10/2010 | Grajek | H04L 9/3263 713/158 |
| 2011/0087882 A1* | 4/2011 | Kuo | G06F 21/57 713/156 |
| 2011/0154024 A1* | 6/2011 | Ignaci | H04L 63/0823 713/156 |
| 2014/0330986 A1* | 11/2014 | Bowes | H04L 69/04 709/247 |

OTHER PUBLICATIONS

Simson L. Garfinkel et al., A User Test of Key Continuity Management with S/MIME and Outlook Express, Jul. 6-8, 2005, ACM, pp. 13-24.*

Jiahai Yang et al., A Web- based, Even t-d riven Management Architecture, Oct. 18-22, 1999, IEEE, vol. 2, pp. 1214-1221.*

Jeremy Clark et al., Revisiting past challenges and evaluating certificate trust model enhancements, May 19-22, 2013, IEEE, pp. 511-525.*

Gibson et al., "Management of Digital Certificates", U.S. Appl. No. 14/844,129, filed Sep. 3, 2015.

List of IBM Patents or Patent Applications Treated as Related, dated Sep. 1, 2015, pp. 1-2.

A10 Networks, "Deployment Guide for IBM WebSphere 8.0", A10 Networks, pp. 1-31. http://www.a10networks.com/resources/files/A10-DG-IBM-Websphere.pdf.

* cited by examiner

MANAGEMENT OF DIGITAL CERTIFICATES

BACKGROUND

The present disclosure relates to digital certificates, and more specifically, to managing digital certificates in an enterprise computing environment.

A commercial, governmental, or other organization may employ multiple computer systems that are connected by a network. As one example, an enterprise may have one or more websites that are relatively large, relatively complex, or both. A relatively large number of computer systems, e.g., servers, of various types may be used to support the website. The computer systems may be located at multiple locations and various computer systems may communicate with one another and systems outside of the enterprise over public networks, such as the internet. Some of the enterprise's computer systems, e.g., web servers, may be configured to interface with external computer systems, such as those of customers and suppliers. Other computer systems may be configured for processing data, retrieving data from enterprise databases, and performing other functions.

A complex network of computer systems in an enterprise environment may be referred to as a distributed application or applications. The enterprise network of computer systems can be set up and managed using a software application designed for this purpose. Software applications of this type are sometimes referred to as "middleware."

Secure communication channels between each enterprise computer system and other internal and external systems is essential for a variety of types of communications. As a few examples, the messages sent in electronic commerce, banking, and stock trading applications include confidential, personal information. In addition, communication between the computer systems needs to be fast. Security for an enterprise network of computer systems can be provided at the transport layer using a protocol known as Secure Sockets Layer (SSL).

The SSL protocol uses electronic documents or files known as "digital certificates." A digital certificate may also be referred to as a public key or signer certificate. An International Telecommunication Union (ITU) standard known as X.509 specifies the contents of a digital certificate. Among other things, a digital certificate contains a public key of the name of a person or entity, the public key of that person or entity, and a digital signature (often of a certificate authority) that certifies that the enclosed public key belongs to the named person or entity.

SUMMARY

Various embodiments are directed to a computer-implemented method for displaying a map of certificate relationships. A method can include retrieving certificate information for two or more servers and storing the retrieved certificate information in a memory. In addition, the method can include receiving a command to generate a map of certificate relationships. The command includes a command scope that identifies at least a first server of the two or more servers. Further, the method can include generating the map from the retrieved certificate information as well as rendering the map on a display device. The map includes the first server and a device that has a certificate relationship with the first server.

Various other embodiments are directed to a computer system for displaying a map of certificate relationships and to a computer program product for causing a processor to perform operations for displaying a map of certificate relationships.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

Figure 1:
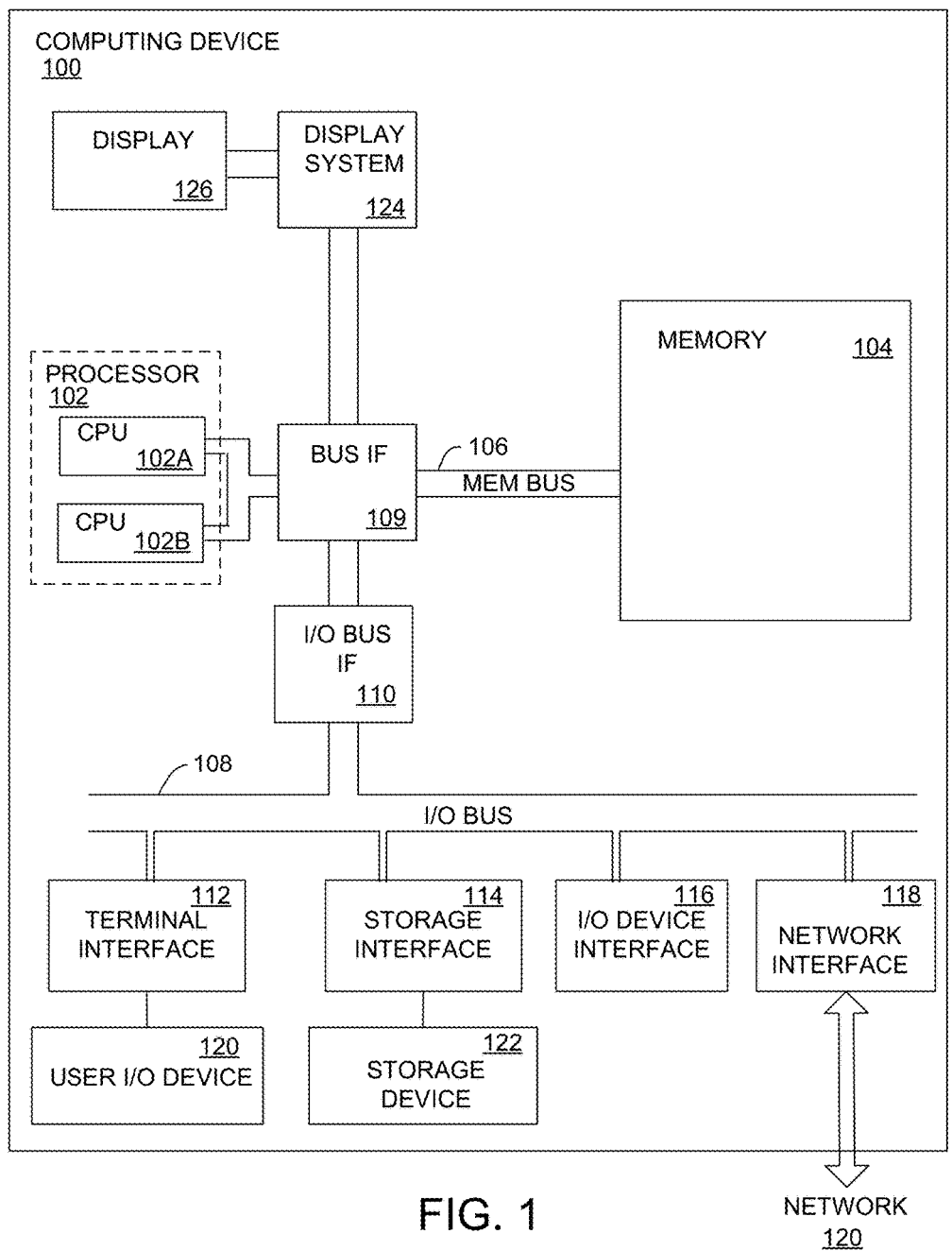
FIG. 1 is a block diagram of an example of a computing device having a memory, in which various embodiments of this disclosure can be implemented.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the present disclosure relate to digital certificates, and more particular aspects relate to managing digital certificates in an enterprise computing environment. While the present disclosure is not necessarily limited to such applications, various aspects of the disclosure may be appreciated through a discussion of various examples using this context.

A "certificate relationship" can be established or exist in several situations. A correspondent device can have a certificate relationship with a first server when the first server accepts a public key of the correspondent device. In addition, a correspondent device can have a certificate relationship with the first server when the correspondent device accepts a public key of the first server. Further, a certificate relationship can exist between a device and a certificate authority. A certificate authority device can have a certificate relationship with the first server when the certificate authority device issues a certificate for a public key of the first server. In addition, a certificate authority device can have a certificate relationship with the first server when the certificate authority device issues a certificate for a public key of a correspondent device that the first server accepts. Where there are a large number of certificates in a managed computing environment, it can be difficult to understand what certificates are being used, when they expire, and how the certificates are related to correspondents within and outside of the managed computing environment.

Embodiments are directed to displaying on a display device various maps of application servers in a network that are within a specified scope according to an organization specification. The map includes at least one first server in a managed environment and a device having a certificate relationship with the first server. Application servers and end points external to the specified scope that have a certificate relationship with one of the application servers within the specified scope can be displayed on the map. In various embodiments, application servers and end points external to the managed environment that have a certificate relationship with one of the application servers within the specified scope can be displayed on the map. The map can be an interactive map in various embodiments. Devices having certificates that have an expiration date within a date criteria can be highlighted on the map. Application servers, end points external to the specified scope, and other locations that store a same copy of a public key, a private key, or a certificate can be displayed on the map. Application servers within the specified scope and application servers and end points external to the specified scope can be represented as icons on the map. The icons representing an application server within the specified scope, and the icons representing an application server or an end point external to the specified scope that have a certificate relationship with a particular application server within the specified scope can be highlighted to show the certificate relationship. Additional features are described below.

FIG. 1 is a block diagram of a computing device 100 according to various embodiments. The computing device 100 is one example of a context in which various embodiments may be implemented. The mechanisms and apparatus of the various embodiments disclosed herein apply equally to any appropriate computing device. The major components of the computing device 100 include one or more processors 102, a memory 104, a terminal interface 112, a storage interface 114, an Input/Output ("I/O") device interface 116, and a network interface 118, all of which are communicatively coupled, directly or indirectly, for inter-component communication via a memory bus 106, an I/O bus 108, bus interface unit ("IF") 109, and an I/O bus interface unit 110.

The computing device 100 may contain one or more general-purpose programmable central processing units (CPUs) 102A and 102B, herein generically referred to as the processor 102. In an embodiment, the computing device 100 may contain multiple processors; however, in another embodiment, the computing device 100 may alternatively be a single CPU device. Each processor 102 executes instructions stored in the memory 104 and may include one or more levels of on-board cache.

In an embodiment, the memory 104 may include a random-access semiconductor memory, storage device, or storage medium (either volatile or non-volatile) for storing or encoding data and programs. In another embodiment, the memory 104 represents the entire virtual memory of the computing device 100, and may also include the virtual memory of other computer systems coupled to the computing device 100 or connected via a network 120. The memory 104 is conceptually a single monolithic entity, but in other embodiments the memory 104 is a more complex arrangement, such as a hierarchy of caches and other memory devices. For example, memory may exist in multiple levels of caches, and these caches may be further divided by function, so that one cache holds instructions while another holds non-instruction data, which is used by the processor or processors. Memory may be further distributed and associated with different CPUs or sets of CPUs, as is known in any of various so-called non-uniform memory access (NUMA) computer architectures.

Figure 2:
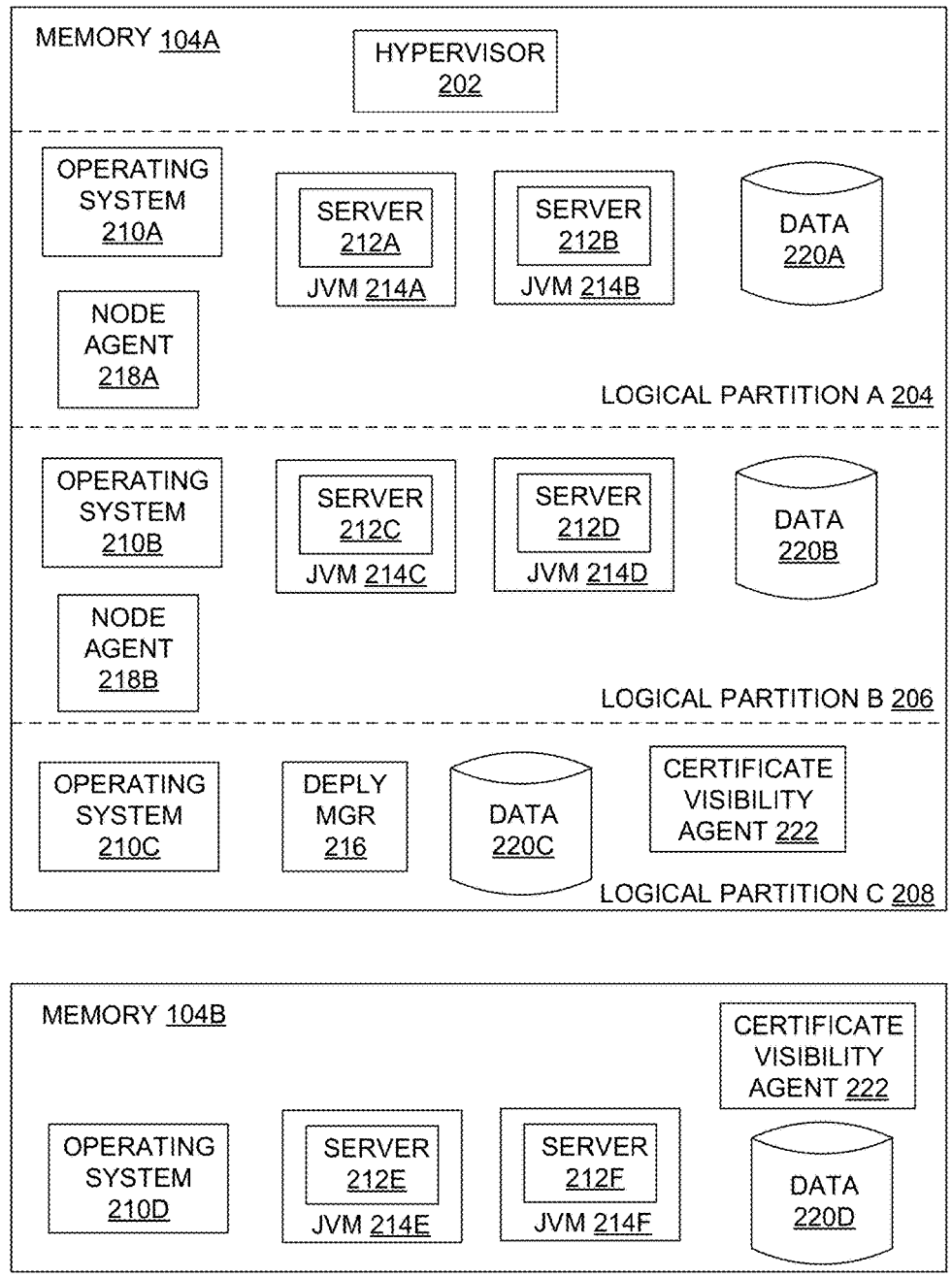
FIG. 2 is a block diagram showing two examples of components and data that can reside in the memory of FIG. 1, according to various embodiments.

FIG. 2 includes two block diagrams, each being an example of components and data that can reside in the memory 104 of FIG. 1, according to various embodiments. The components and data shown in FIG. 2 are described in greater detail below. The memory 104 may store all or a portion of the components and data shown in FIG. 2. These programs and data structures are illustrated in FIG. 2 as being included within the memory 104 in the computing device 100, however, in other embodiments, some or all of them may be on different computer systems and may be accessed remotely, e.g., via a network 120. The computing device 100 may use virtual addressing mechanisms that allow the programs of the computing device 100 to behave as if they only have access to a large, single storage entity instead of access to multiple, smaller storage entities. Thus, while the components and data shown in FIG. 2 are illustrated as being included within the memory 104, these components and data are not necessarily all completely contained in the same storage device at the same time. Further, although the components and data shown in FIG. 2 are illustrated as being separate entities, in other embodiments some of them, portions of some of them, or all of them may be packaged together.

In an embodiment, the components and data shown in FIG. 2 may include instructions or statements that execute on the processor 102 or instructions or statements that are interpreted by instructions or statements that execute on the processor 102 to carry out the functions as further described below. In another embodiment, the components shown in FIG. 2 may be implemented in hardware via semiconductor devices, chips, logical gates, circuits, circuit cards, and/or other physical hardware devices in lieu of, or in addition to, a processor-based system. In various embodiments, the components shown in FIG. 2 may include data in addition to instructions or statements.

Referring to FIG. 1, the computing device 100 may include a bus interface unit 109 to handle communications among the processor 102, the memory 104, a display system 124, and the I/O bus interface unit 110. The I/O bus interface unit 110 may be coupled with the I/O bus 108 for transferring data to and from the various I/O units. The I/O bus interface unit 110 communicates with multiple I/O interface units 112, 114, 116, and 118, which are also known as I/O processors (IOPs) or I/O adapters (IOAs), through the I/O bus 108. The display system 124 may include a display controller, a display memory, or both. The display controller may provide video, audio, or both types of data to a display device 126. The display memory may be a dedicated memory for buffering video data. The display system 124 may be coupled with a display device 126, such as a standalone display screen, computer monitor, television, or a tablet or handheld device display. In an embodiment, the display device 126 may include one or more speakers for rendering audio. Alternatively, one or more speakers for rendering audio may be coupled with an I/O interface unit. In alternate embodiments, one or more of the functions provided by the display system 124 may be on board an integrated circuit that also includes the processor 102. In addition, one or more of the functions provided by the bus interface unit 109 may be on board an integrated circuit that also includes the processor 102.

The I/O interface units support communication with a variety of storage and I/O devices. For example, the terminal interface unit 112 supports the attachment of one or more user I/O devices 120, which may include user output devices (such as a video display device, speaker, and/or television set) and user input devices (such as a keyboard, mouse, keypad, touchpad, trackball, buttons, light pen, or other pointing device). A user may manipulate the user input devices using a user interface, in order to provide input data and commands to the user I/O device 120 and the computing device 100, and may receive output data via the user output devices. For example, a user interface may be presented via the user I/O device 120 or display device 126, such as displayed on a display device, played via a speaker, or printed via a printer.

The storage interface 114 supports the attachment of one or more disk drives or direct access storage devices 122 (which are typically rotating magnetic disk drive storage devices, although they could alternatively be other storage devices, including arrays of disk drives configured to appear as a single large storage device to a host computer, or solid-state drives, such as flash memory). In another embodiment, the storage device 122 may be implemented via any type of secondary storage device. The contents of the memory 104, or any portion thereof, may be stored to and retrieved from the storage device 122 as needed. The I/O device interface 116 provides an interface to any of various other I/O devices or devices of other types, such as printers or fax machines. The network interface 118 provides one or more communication paths from the computing device 100 to other digital devices and computer systems; these communication paths may include, e.g., one or more networks 120.

Although the computing device 100 shown in FIG. 1 illustrates a particular bus structure providing a direct communication path among the processors 102, the memory 104, the bus interface 109, the display system 124, and the I/O bus interface unit 110, in alternative embodiments the computing device 100 may include different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface unit 110 and the I/O bus 108 are shown as single respective units, the computing device 100 may, in fact, contain multiple I/O bus interface units 110 and/or multiple I/O buses 108. While multiple I/O interface units are shown, which separate the I/O bus 108 from various communications paths running to the various I/O devices, in other embodiments, some or all of the I/O devices are connected directly to one or more system I/O buses.

In various embodiments, the computing device 100 is a multi-user mainframe computer system, a single-user system, or a server computer or similar device that has little or no direct user interface, but receives requests from other computer systems (clients). In other embodiments, the computing device 100 may be implemented as a desktop computer, portable computer, laptop or notebook computer, tablet computer, pocket computer, telephone, smart phone, or any other suitable type of electronic device.

FIGS. 1 and 2 are intended to depict the representative major components of the computing device 100. Individual components, however, may have greater complexity than represented in FIGS. 1 and 2, components other than or in addition to those shown in FIGS. 1 and 2 may be present, and the number, type, and configuration of such components may vary. Several particular examples of additional complexity or additional variations are disclosed herein; these are by way of example only and are not necessarily the only such variations. The various program components illustrated in FIG. 2 may be implemented, in various embodiments, in a number of different manners, including using various computer applications, routines, components, programs, objects, modules, data structures, etc., which may be referred to herein as "software," "computer programs," or simply "programs."

FIG. 2 depicts two examples of some components and data that can reside in the memory 104, according to various embodiments. In example memory 104A, a hypervisor (also called a virtual machine manager) 202 is stored in the memory. The hypervisor 202 can be used to set up one or more logical partitions. In the example, logical partitions A, B, and C, respectively numbered 204, 206, and 208, are shown. In addition, the memory 104A stores three operating systems 210A, 210B, and 210C. The operating systems 210 can be multiple instances of the same operating systems or different operating systems. One or more application servers 212A, 212B, 212C, and 212D can be stored in the memory 104A. According to various embodiments, an application server 212 runs inside a Java virtual machine (JVM) 214. One or more Java virtual machines 214A, 214B, 214C, and 214D can be stored in the memory 104A. In the example, each application server 212 is shown inside an associated Java virtual machine 214. As illustrated, one or more pairs of an application server 212 and a Java virtual machine 214 can run within each of the logical partitions 204 and 206. The memory 104A can also store one or more node agents 218A and 218B. In the example, the node agents 218A and 218B are respectively associated with the logical partitions 204 and 206 and the application servers 212 within the respective logical partitions. Further, the memory 104A can store one or more deployment managers 216. In the example, a deployment manager 216 is associated with the logical partition 208. Additionally, one or more data files, databases, or data stores 220A, 220B, and 220C can be stored in the memory 104A. In the example, data files 220A, 220B, and 220C are associated with the applications of each of the logical partitions 204, 206, and 208. Additionally, the memory 104A can store a certificate visibility agent 222. In the example, a certificate visibility agent 222 is associated with the logical partition 208.

FIG. 2 also shows a memory 104B. The example memory 104B can include an operating system 210D, one or more application servers 212E and 212F, one or more Java virtual machines 214E and 214F, one or more data files 220D, and a certificate visibility agent 222.

Figure 3:
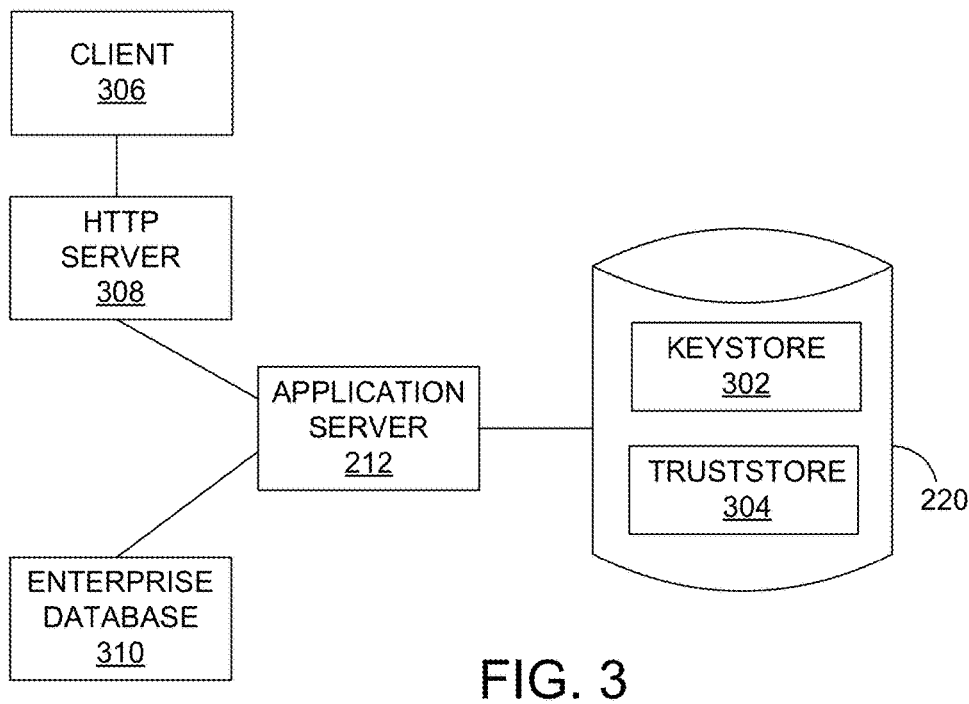
FIG. 3 is a block diagram of an application server according to various embodiments.

FIG. 3 depicts an application server 212. Each application server 212 includes a data store 220 that includes a keystore 302 and a truststore 304. Keystores and truststores are described in further detail below. Client web browsers 306 may direct requests to one or more HTTP servers 308 of an enterprise website. The HTTP servers 308, in turn, send messages relating to the underlying client requests to one or more application servers 212. The application servers 212 can perform processing and can make requests to enterprise databases 310. The various communications between application servers 212, client web browsers 306, HTTP servers 308, and enterprise databases 310 may be secured using SSL.

Figure 4:
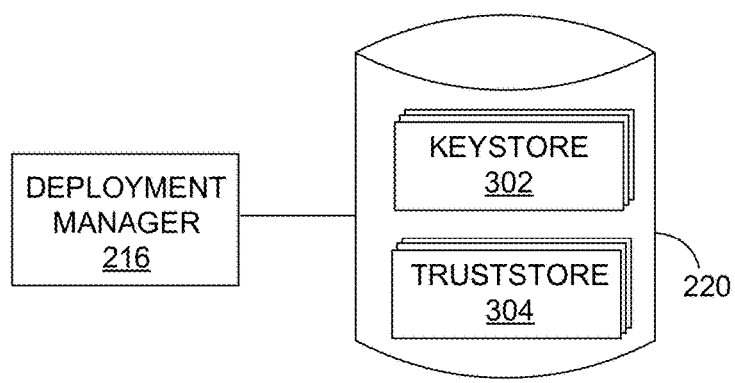
FIG. 4 is a block diagram of a deployment manager according to various embodiments.

FIG. 4 depicts a deployment manager 216. Each deployment manager 216 includes a data store 220 that includes two or more keystores 302 and two or more truststores 304. The deployment manager 216 manages two or more application servers organized into a group that may be referred to as a cell. The deployment manager 216 maintains a duplicate keystore 302 and truststore 304 for each application server 212 in a cell managed by the deployment manager 216. In addition, the deployment manager 216 can serve as a certificate authority for the application servers that it manages.

A keystore, such as the keystore 302, is for storing an application server's private keys. In addition, a keystore can store the public keys that correspond with each of the private keys in the keystore, the digital certificates associated with these public keys, and other attributes associated with each public-private key pair. A truststore, such as the truststore 304, is for storing the public keys of other servers (or other parties or entities) that an application server 212 trusts. In addition, a truststore can store the digital certificates of other entities that are associated with the public keys in the truststore. As shown in FIG. 3, each server can have a key store and a trust store. The key and trust stores are electronic files or data structures.

The public keys, private keys, and digital certificates stored in various keystores and truststores are used in the Secure Sockets Layer protocol. SSL can be used to provide secure connections between computers in the transport layer. SSL has been provided in various versions (e.g., 1, 2, 3, and Open SSL) and has been succeeded by Transport Layer Security (TLS). To simplify this description, the acronym SSL is used herein to refer generally to all versions of SSL and TLS.

The SSL protocol includes two sub-protocols. A first sub-protocol is used to establish a connection. A second sub-protocol is used to exchange data. When a first correspondent wants to establish a secure channel to send a message to a second correspondent, the first correspondent sends a request for a connection to the second correspondent. According to the first sub-protocol, the second correspondent responds to the request by sending the first correspondent a certificate that contains the second correspondent's public key and a certification that this public key belongs to the second correspondent. The certification is a digital certificate, which may also be referred to herein as a "signer certificate." Signer certificates are stored in the truststores 304. Various additional steps are included in the SSL protocol to establish a secure channel, which may include a request by the second correspondent for the first correspondent's signer certificate. A description of the second SSL sub-protocol, which is used for exchanging data, is not provided herein in order to not obscure the disclosed embodiments.

The public key that can be included in a signer certificate is used along with a private key in a symmetric key algorithm. The public key of a particular correspondent can be made public and used by anyone for encrypting a message to be sent to the particular correspondent. The private key is kept secret and is used by the particular correspondent to decrypt messages sent to it. Another type of digital certificate can contain a public key, a private key, and a certification that the public key belongs to the owner. This type of certificate is referred to herein as a "personal certificate." Personal certificates are stored in the keystores 302.

A "signer exchange" between first and second correspondents, e.g., first and second application servers, is part of the first SSL sub-protocol. In a typical signer exchange, each correspondent sends the other its signer certificate. On receipt and acceptance, it is stored in the correspondent's truststore.

A digital certificate can be signed by a certificate authority or by the correspondent itself, i.e., self-signed. A certificate authority is a trusted third party. A certificate authority can be a public certificate authority or a private certificate authority. A digital certificate can contain a chain of certificates. In chain of certificates, the trustworthiness of a first certificate authority is certified by a second certificate authority. The trustworthiness of the second certificate authority may be certified by a third certificate authority, and so on. The third certificate authority or another certificate authority further up the tree may be a root certificate authority. A root certificate authority is a certificate authority known to be trustworthy. The deployment manager 216 can serve as a certificate authority for application servers that it manages, i.e., the application servers within its cell.

Figure 5:
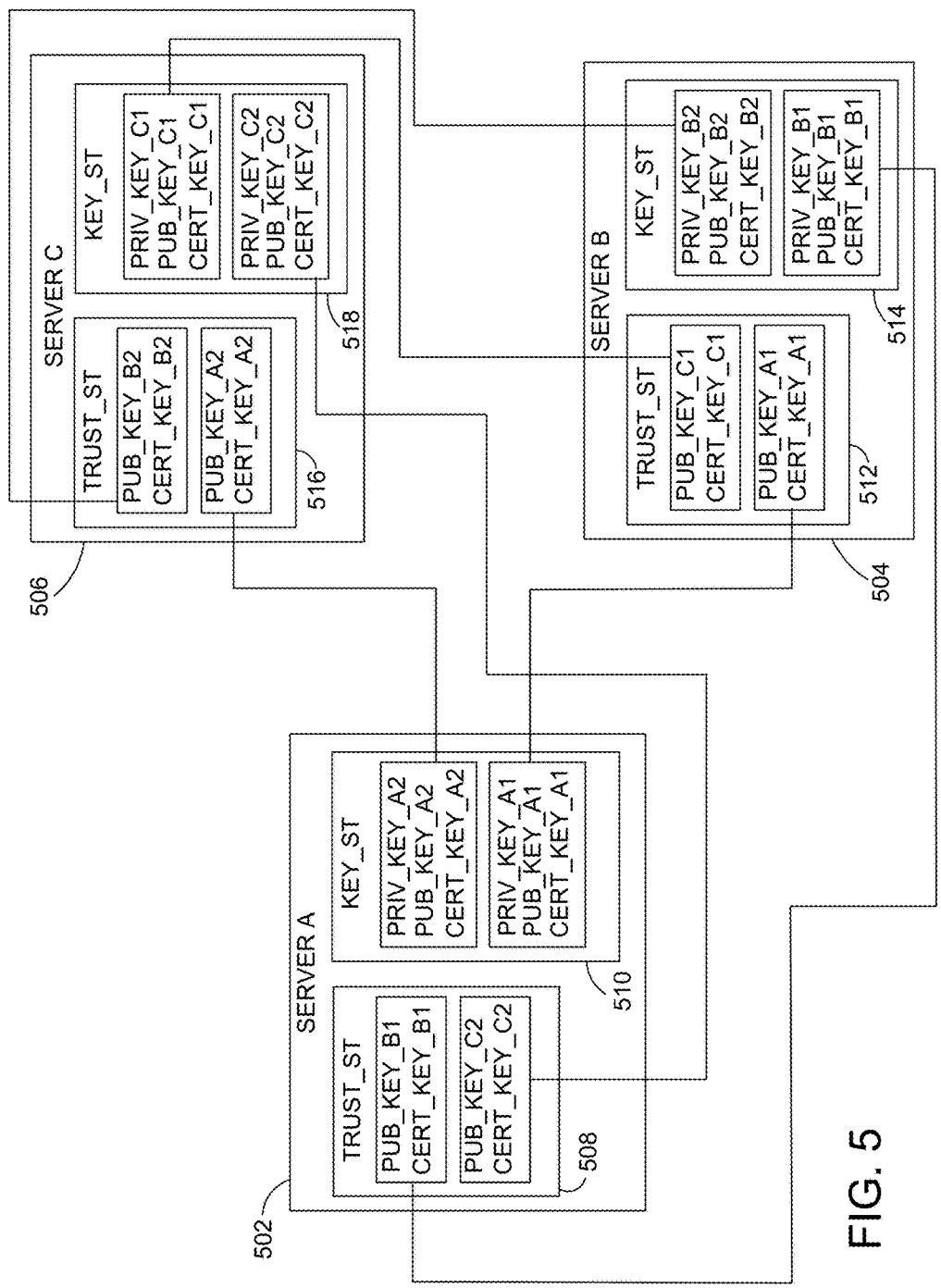
FIG. 5 is a block diagram of three application servers illustrating certificate relationships associated with personal and signer certificates for the application servers, according to various embodiments.

FIG. 5 is a block diagram illustrating certificate relationships associated with personal and signer certificates for three application servers. FIG. 5 depicts application servers A 502, B 504, and C 506. The application server A 502 includes truststore 508 and keystore 510. The application server B 504 includes truststore 512 and keystore 514. The application server C 506 includes truststore 516 and keystore 518. FIG. 5 illustrates an example in which the servers A, B, and C have successfully exchanged signer certificates. Each solid line between servers represents a personal certificate-signer certificate pair. Stated differently, each solid line between servers represents a private key-public key pair. As one example, the truststore (TRUST_ST) 508 for server A 502 includes a public key (PUB_KEY_B1) and a digital certificate (CERT_KEY_B1) that it received from server B 504. Server B 504 stores public key (PUB_KEY_B1), digital certificate (CERT_KEY_B1), and corresponding private key (PRIV_KEY_B1) in its keystore (KEY_ST) 514. Server A 502 can use the public key PUB_KEY_B1 to encrypt a message it sends to sever B 504. Server B 504 will decrypt this message with its private key PRIV_KEY_B1. If server A 502 is considered a first server and server B 504 a correspondent of server A, the correspondent server B has a certificate relationship with the first server A when the first server A accepts a public key of the correspondent B.

As another example, the truststore 512 for server B 504 includes a public key (PUB_KEY_A1) and a digital certificate (CERT_KEY_A1) that it received from server A. Server A 502 stores public key (PUB_KEY_A1), digital certificate (CERT_KEY_A1), and corresponding private key (PRIV_KEY_A1) in its keystore (KEY_ST) 510. Server B 504 can use the public key PUB_KEY_A1 to encrypt a message it sends to sever A 502. Server A 502 will decrypt this message with its private key PRIV_KEY_A1. If server A 502 is considered a first server and server B 504 a correspondent of server A, the correspondent server B has a certificate relationship with the first server A when the correspondent server B accepts a public key of the first server A.

While a certificate authority device is not shown in FIG. 5, each digital certificate (CERT_KEY_XX) in the figure is issued by a certificate authority. A certificate authority device has a certificate relationship with the first server A 502 when the certificate authority device issues a certificate for a public key of the first server A. In addition, a certificate authority device has a certificate relationship with the first server A 502 when the certificate authority device issues a certificate for a public key of a correspondent server B 504 that the first server A accepts.

In the example of FIG. 5, server A 502 transmits "outbound" messages to server B 504 using public-private key pair B1. Server A 502 receives "inbound" messages from server B 504 using public-private key pair A1. As shown in FIG. 5, different public-private key pairs can be used for each correspondent. For instance, in the example of FIG. 5, server A 502 transmits outbound messages to server C 506 using public-private key pair C2. Server A 502 receives inbound messages from server C 506 using public-private key pair A2. Additional examples of distinct public-private key pairs for communications between server B 504 and server C 506 are shown in FIG. 5.

As may be seen from FIG. 5, an application server can use a unique public-private key pair for each correspondent that it receives messages from, as well as a unique public-private key pair for each correspondent that it sends messages to. Accordingly, an application server can store many unique personal certificates in its keystore and many unique signer certificates in its truststore. Moreover, the keys are not static. Public-private key pairs are generally changed or rotated on a periodic basis. Further, the signature of a certificate authority in a digital certificate is typically only valid for a particular period. Digital certificates must be periodically updated or replaced. A digital certificate can include a chain of certificates and each certificate in the chain typically has a valid period, and each certificate in the chain must be periodically updated or replaced. Accordingly, it can be difficult to understand what certificates are being used, when they expire, and how the certificates are related to correspondents within and outside of the managed computing environment.

Figure 6:
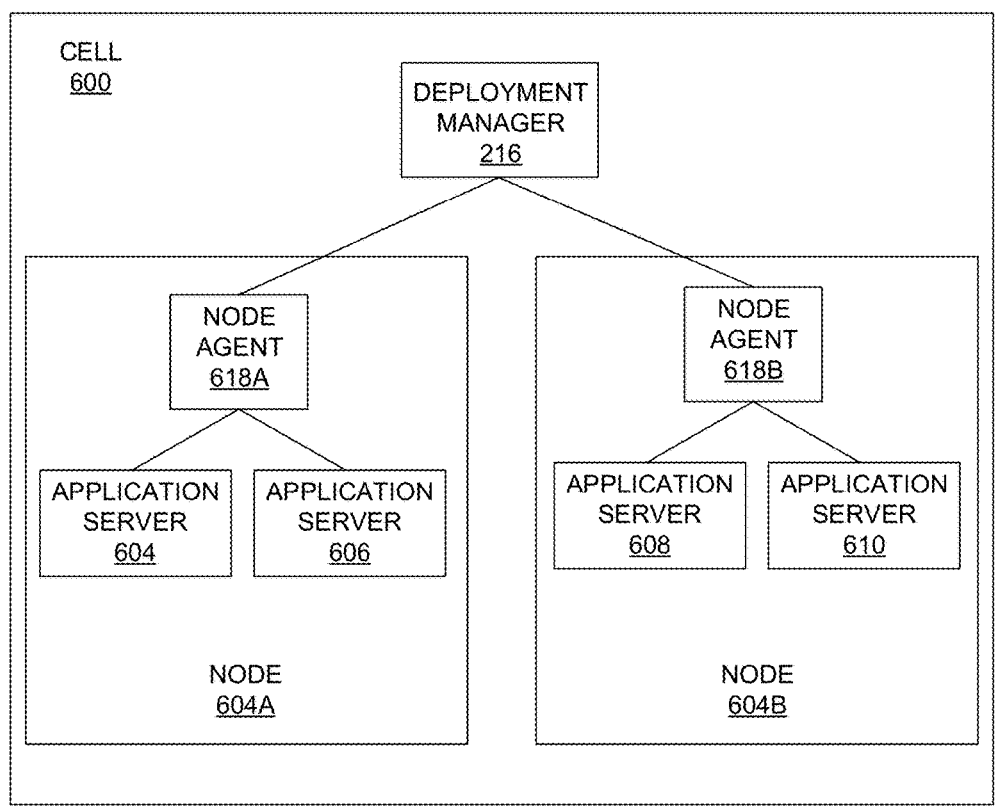
FIG. 6 is a block diagram of an organization structure for a group of servers that includes a cell administered by a deployment manager, the cell having two nodes, each node having a node agent and two application servers, according to various embodiments.

FIG. 6 is a block diagram of an organization structure for a group of servers according to various embodiments. The organization structure of FIG. 6 includes a cell 600 that includes a deployment manager 216. A cell can include one or more nodes that are managed as a group. In the example of FIG. 6, the cell 600 includes nodes 604A and 604B. A node includes a node agent. The node 604A includes a node agent 618A, and the node 604B includes a node agent 618B. A node agent works with the deployment manager 216 to manage a node. A node can include one or more application servers. A node is a logical group of application servers that share a common configuration repository. A node must be on a single computer system 100, but a single computer system 100 can host one or more nodes. In the example of FIG. 6, the node 604A includes application servers 604 and 606, and the node 604B includes application servers 608 and 610.

FIG. 6 is intended to illustrate the organization and topological structure of a cell. Generally, FIG. 6 is a somewhat simplified depiction of a cell in a typical managed enterprise environment. A node can include more than two application servers and a cell can include more than two nodes. In addition, an enterprise environment may include multiple cells. As one example, an enterprise environment may include on the order of 100 application servers organized into various nodes and cells.

Figure 7:
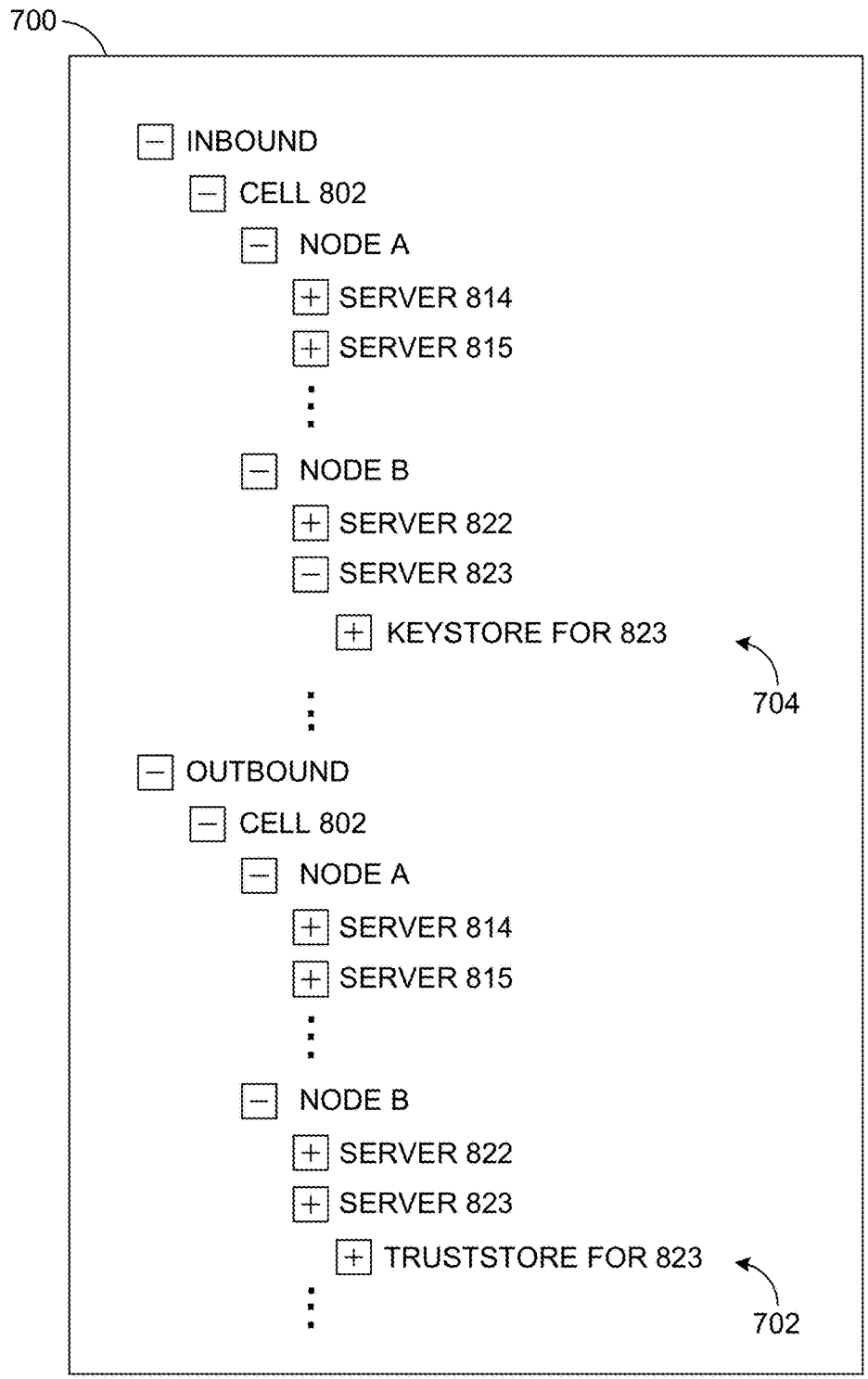
FIG. 7 illustrates a directory of application servers, according to various embodiments.

FIG. 7 depicts an example of a directory 700 for a cell that may be displayed to a user. The directory 700 may be rendered on a display device. The directory 700 allows an administrative user to expand or collapse a level. In the example shown in FIG. 7, the inbound and outbound sections have been expanded to display a cell 802. The inbound and outbound sections of cell 802 have been expanded to show that it contains two nodes A and B. The node A in both of the inbound and outbound sections has been expanded to show that the node A contains application servers 814 and 815. Similarly, the node B in both of the inbound and outbound sections has been expanded to show that the node B contains application servers 822 and 823. If an administrative user wishes to see the signer certificates for a particular application server, the user must expand the view of the server to reveal its truststore and then expand the truststore. FIG. 7 shows an example of the application server 823 having been expanded to show its truststore (reference number 702). In a similar manner, if an administrative user wishes to see the personal certificates for a particular application server, the user must expand the view of the server to reveal its keystore and then expand the keystore. FIG. 7 shows an example of the application server 823 having been expanded to show its keystore (reference number 704). While the directory 700 provides an administrative user with information about all signer and personal certificates in a managed domain, the directory 700 has some disadvantages.

One disadvantage of the directory 700 is that it does not scale well when the number of cells, application servers, and certificates becomes large. Information in the directory can only be obtained by drilling down on individual servers in the directory. When the number of cells, application servers, and certificates is large, the user is unable to readily understand an overall picture or map of signer and personal certificates. In other words, an administrative user is unable to readily understand signer and personal certificate correspondent relationships within a specified scope of an enterprise computing environment. It may not be possible to simultaneously view all correspondent relationships for a particular scope, such as a cell. Moreover, the administrative user is unable to readily understand signer and personal certificate correspondent relationships with end points that are outside of a managed enterprise computing infrastructure or outside of a managed computing environment. End points outside of the managed environment may not be presented directly in the directory tree. Instead, the directory structure forces the user to repeatedly drill down on individual cells, nodes, and servers to construct a map of relationships. This is a tedious, time consuming task, especially when the number of cells, application servers, and certificates becomes large. Moreover, oftentimes keys and certificates are assigned default alias names, which may be similar, making it difficult to distinguish one key or certificate from another.

Figure 8:
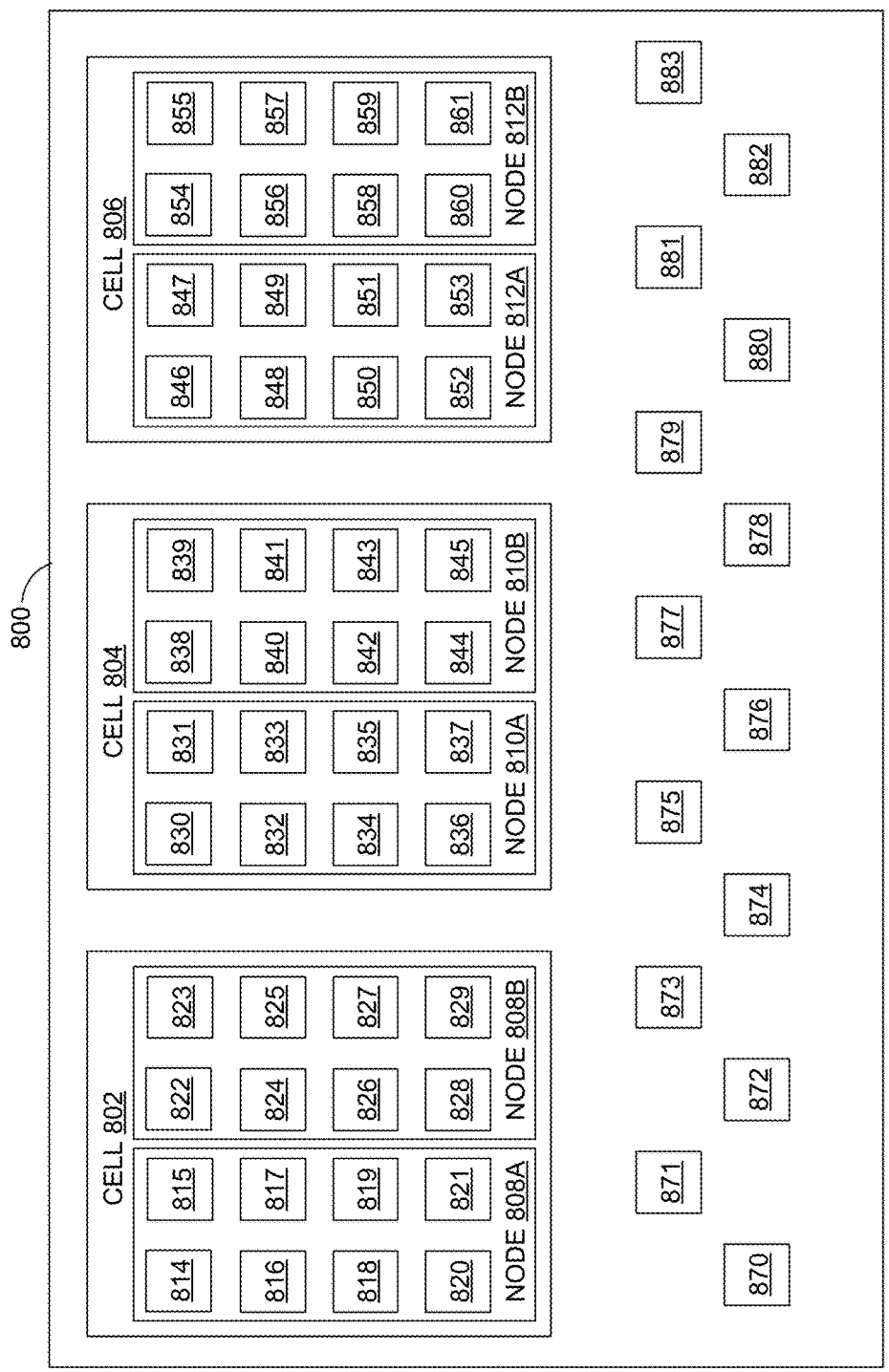
FIG. 8 depicts an interactive map illustrating a plurality of application servers organized for administration into cells and nodes, and a plurality of external end-point devices, according to various embodiments.

FIG. 8 is an interactive map 800 illustrating a plurality of application servers organized for administration into cells and nodes, and a plurality of end-point devices, e.g., application servers, other servers, and clients, according to various embodiments. The map 800 may be rendered on a display device in response to a user input that specifies a scope. The interactive map 800 provides an administrative user with an overall picture or map of all or a portion of an enterprise computing environment, depending on the specified scope. In the example of FIG. 8, an administrative user has specified a scope of cells 802, 804, and 806. In other embodiments, the scope may be specified as a single cell or a single application server. The scope may be constrained to the truststores or keystores of the application servers in a cell or a single application server. In some embodiments, the scope can be specified to include a group of one or more known end points. Scope may specify inbound or outbound correspondents for particular servers. Scope may specify certificates meeting a particular criteria, such as having an expiration date within a certain time period, a certain root certificate authority, or other suitable criteria.

Because the scope in the example of FIG. 8 is the cells 802, 804, and 806, the map 800 includes cells 802, 804, and 806. In addition, external end points that have a correspondent certificate relationship with administrative servers in the cells 802, 804, and 806 are displayed on the map 800. In various embodiments, when a scope specifies particular servers, other servers and end points that are not within the scope, but which have a correspondent relationship with one or more of the particular servers within the scope are displayed. As shown in FIG. 8, external correspondent end points 870-883 for a particular scope of servers (cells 802-804) are simultaneously shown in a single view on the map 800.

In FIG. 8, nodes within a cell are shown. The cell 802 includes nodes 808A and 808B. The cell 804 includes nodes 810A and 810B. The cell 806 includes nodes 812A and 812B. In addition, application servers within a node may be depicted with icons. The node 808A includes application servers 814-821. The node 808B includes application servers 822-829. The node 810A includes application servers 830-837. The node 810B includes application servers 838-845. The node 812A includes application servers 846-853. The node 812B includes application servers 854-861. In addition, the map 800 includes end points 870-883. The end points 870-883 may be any type of client or server that is external to one of the managed application servers 814-861. The end points 870-883 may be clients or servers that are external or internal to the enterprise. In various embodiments, the end points 870-883 may be correspondents of one of the in-scope servers. The end points 870-883 may be clients or servers that are internal to the enterprise, but which are not within the scope specified in the user input command for displaying the map 800. In addition, the end points 870-883 may be clients or servers that are internal to the enterprise, but which are not managed by a middleware software application for managing a distributed application supported by an enterprise network of computer systems. While not shown in the example of FIG. 8, the map 800 can include one or more deployment managers having a truststore or keystore, if so specified in the scope. One or more of the application servers 814-853, end points 870-883 may be a certificate authority. The map 800 may be generated by a certificate visibility agent 222.

In various embodiments, a certificate visibility agent 222 may be configured to monitor the expiration dates of particular, e.g., all, signer and personal certificates held by managed group of application servers in an enterprise computing environment, e.g., one or more cells or nodes. The certificate visibility agent 222 may monitor expiration dates periodically according to a schedule or may perform monitoring in response to a user input. Monitoring can include determining or identifying certificates that have an expiration date within a date criteria. For example, the date criteria may be certificates that will expire in the next 30 or 45 days. As another example, the date criteria may be certificates that have expired. Results of monitoring may be stored in a file. Results of monitoring may be rendered as a report or displayed on a display device.

Figure 9:
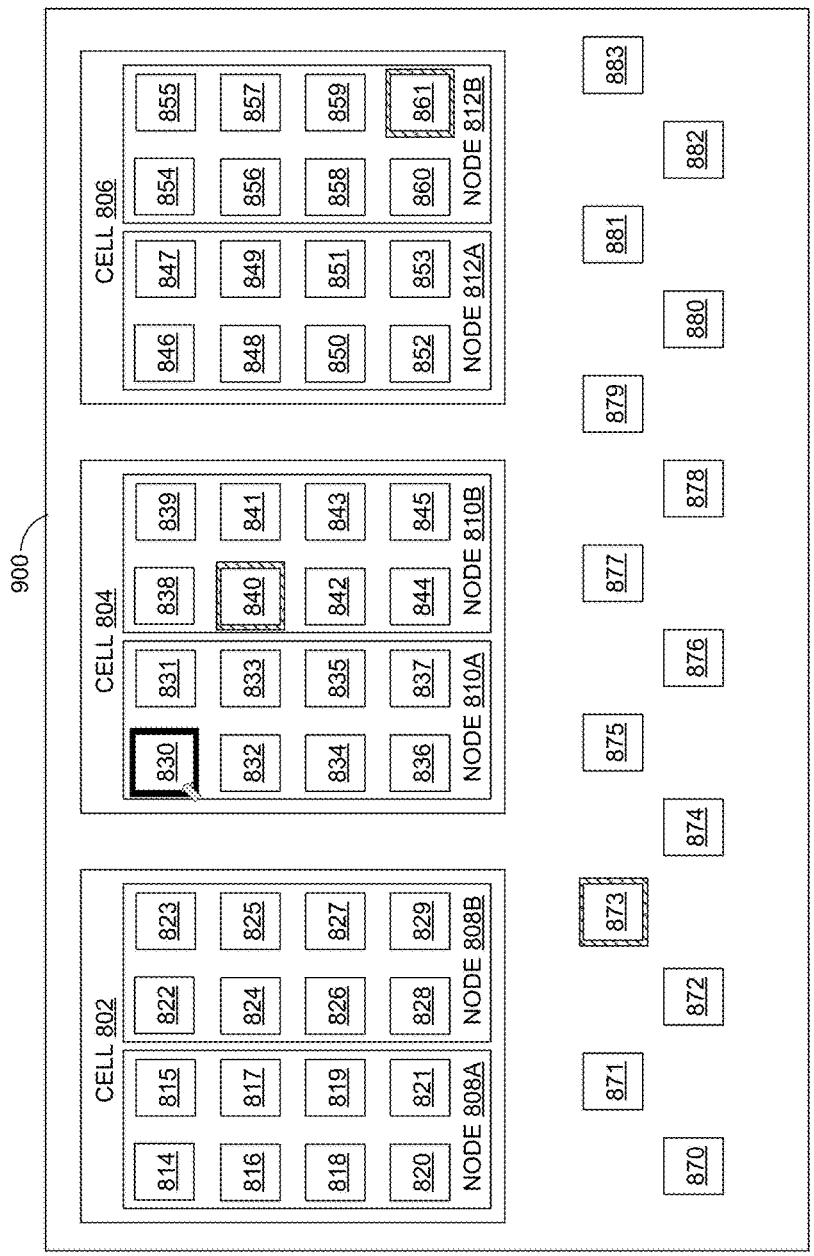
FIG. 9 depicts an interactive map illustrating a plurality of application servers organized for administration into cells and nodes, and a plurality of external end point devices for which devices having certificates satisfying a date criteria are highlighted, according to various embodiments.

FIG. 9 depicts an interactive map 900 illustrating a plurality of application servers organized for administration into cells and nodes, and a plurality of external end-point devices for which devices having certificates satisfying a date criteria are highlighted, according to various embodiments. The interactive map 900 may be displayed in response to a user input and may show certificates nearing expiration, according to various embodiments. Map 900 may be rendered in response to a user command to display servers having certificates nearing expiration for a specified scope. In alternative embodiments, map 900 may be rendered in response to a user command to display servers having expired certificates for a specified scope. The user may specify either signer, personal, or both types of certificates for the specified scope. In the example of FIG. 9, the user has specified that servers having personal certificates for the cells 802, 804, and 806 that will expire in 30 days be included on the map. In response to the user input, application server 830 is highlighted, as indicated by the solid line enclosing the icon for the server. In this example, application server 830 has three personal certificate that meet the expiration criteria. Correspondents that have a signer certificate corresponding with one of the personal certificates of application server 830 nearing expiration are highlighted, as indicated by a striped line enclosing the icon for the server. Specifically, application servers 840 and 861, and external end point 873 have signer certificates corresponding with the personal certificates nearing expiration. To simplify the example, only a single server having certificates nearing expiration is shown. It should be understood that two or more application servers having a certificate that meet the expiration criteria may be highlighted. A user can roll a cursor or other pointing device over or click on one of the highlighted application servers. In response, to the roll over, click, or other similar input, application servers and end points having corresponding certificates are highlighted. The map 900 may be generated by a certificate visibility agent 222 using a query support file or data structure.

Figure 10:
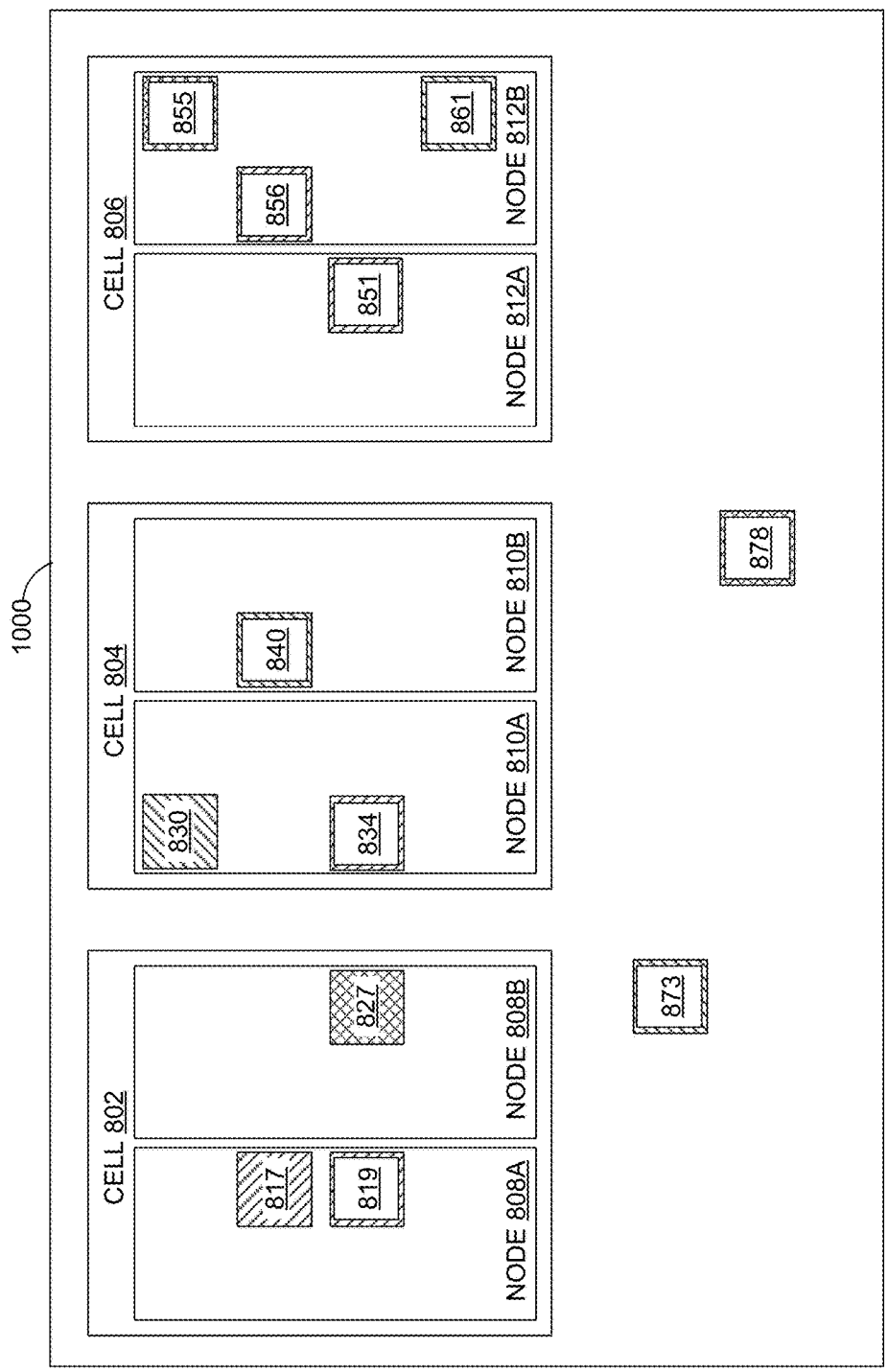
FIG. 10 depicts an alternative interactive map illustrating a plurality of application servers organized for administration into cells and nodes, and a plurality of external end-point devices for which devices having certificates satisfying a date criteria are highlighted, according to various embodiments.

FIG. 10 depicts an alternative interactive map 1000 illustrating a plurality of application servers organized for administration into cells and nodes, and a plurality of external end-point devices for which devices having certificates satisfying a date criteria are highlighted, according to various embodiments Like the map 900, map 1000 may be rendered in response to a user command to display servers having certificates nearing expiration for a specified scope. In the example of FIG. 9, the map 900 includes all application servers within the specified scope with servers or correspondents having certificates nearing expiration being highlighted. In contrast, the map 1000 of FIG. 10 may exclude application servers within the specified scope that do not satisfy an expiration date or other criteria. Instead, only servers that are within the specified scope and which meet the certificate expiration criteria (or some other specified criteria) may be displayed. In addition, correspondents and end points having a correspondent relationship with an in-scope server that meets the certificate expiration criteria may be displayed. In the example of FIG. 10, the servers 817, 827, and 830 are within a specified scope (cells 802, 804, and 806) and have one or more certificates that meet a certificate expiration criteria, e.g., at least one certificate will expire in the next 30 days. The map 1000 only shows the servers 817, 827, and 830 and their respective correspondents and end points. Icons for each of the servers 817, 827, and 830 may be highlighted in a distinct manner, e.g., a distinct color. Icons for each of the respective correspondents and end points are highlighted according to the same distinct design as its associated server. In the example of FIG. 10, server 830 has certificates that meet the expiration criteria that are associated with servers 840, 861, and end point 873. The server 817 has certificates that meet the expiration criteria that are associated with servers 819, 834, 851, and 856. In addition, the server 827 has certificates that meet the expiration criteria that are associated with server 855 and 878. The example of FIG. 10 illustrates that two or more servers or external correspondents that are both within scope and meet the certificate expiration criteria, may be simultaneously shown on a map.

In various embodiments, when a certificate that needs to be replaced is identified, the interactive map 900 or 1000 can provide an input command for an administrative user to cause a replacement certificate to be automatically generated or requested. Any known protocol may be performed that will cause a replacement certificate to be issued, for example, a message may be sent to a key owner or a certificate authority requesting a new key or certificate.

Figure 11:
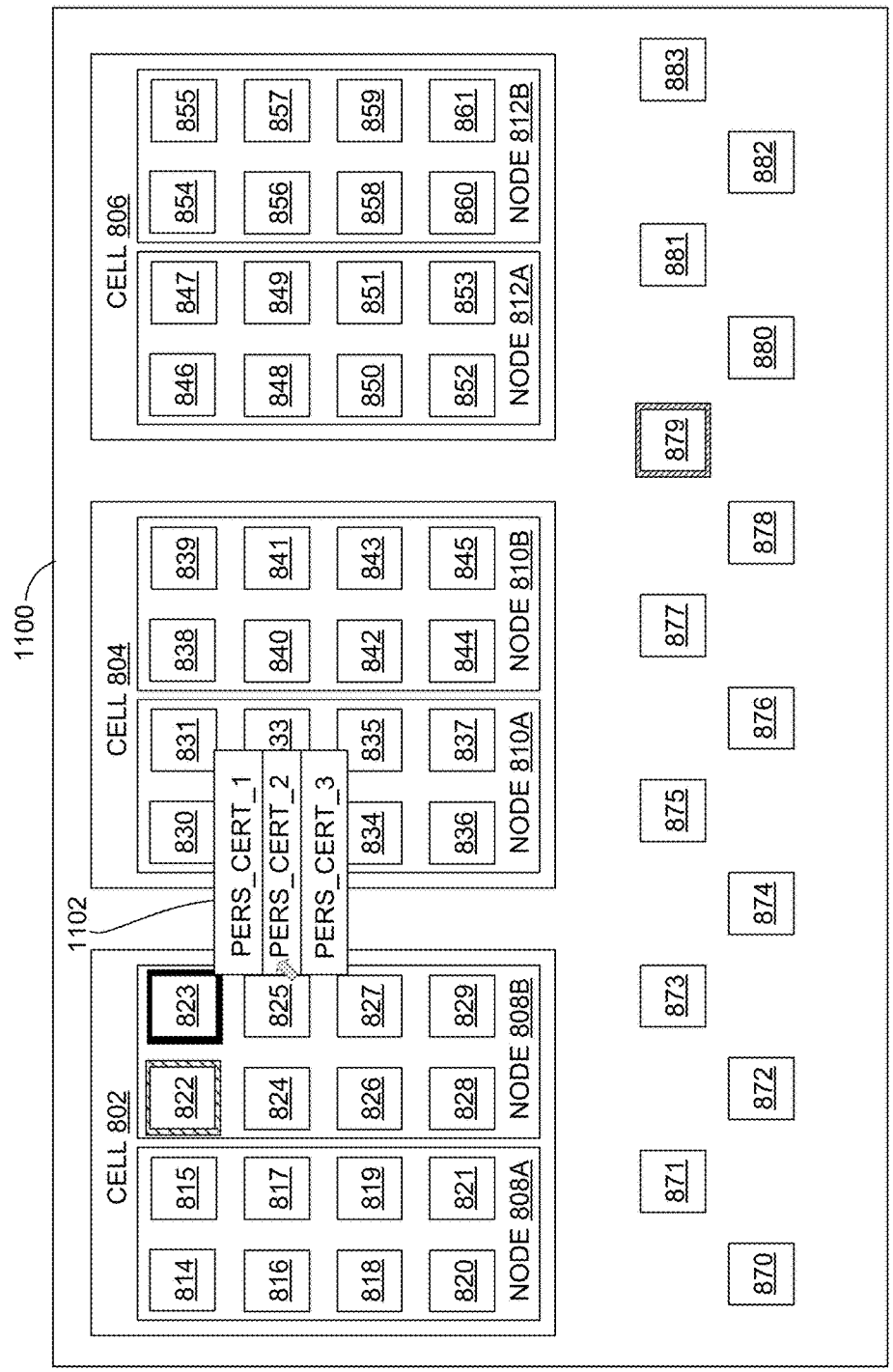
FIG. 11 depicts interactive map illustrating a plurality of application servers organized for administration into cells and nodes, and a plurality of external end-point devices for which devices having a certificate relationship associated with a personal certificate of a first server are highlighted, according to various embodiments.

FIG. 11 depicts interactive map 1100 illustrating a plurality of application servers organized for administration into cells and nodes, and a plurality of external end-point devices for which devices having a certificate relationship associated with a personal certificate of a first server are highlighted, according to various embodiments. The map 1100 may be rendered on a display device in response to a user command to display a personal certificate mapping for a specified scope. Once the map 1100 is rendered, a first user command can be used to select a particular application server. In response to the selection, a menu 1102 listing personal certificates stored in the keystore of the particular application server is displayed. In the example of FIG. 11, application server 823 has been selected by a user, as indicated by the solid line enclosing the icon for the server. The menu 1102 shows that application server 823 has three personal certificates in its keystore. A second user command can be used to select one of the personal certificates in the keystore of application server 823. In response to the selection of one of the personal certificates, other locations where the personal certificate is stored and locations of corresponding signer certificates are highlighted. In the example of FIG. 11, the personal certificate is also stored in application server 822, which is highlighted, as indicated by the striped line enclosing the icon for the server 822. In addition, in this example, a corresponding signer certificate is stored in end point 879, and this location is also highlighted, as indicated by the fine diagonal striped line enclosing the icon for the server 879. The map 1100 may be generated by a certificate visibility agent 222 using a query support file or data structure.

Figure 12:
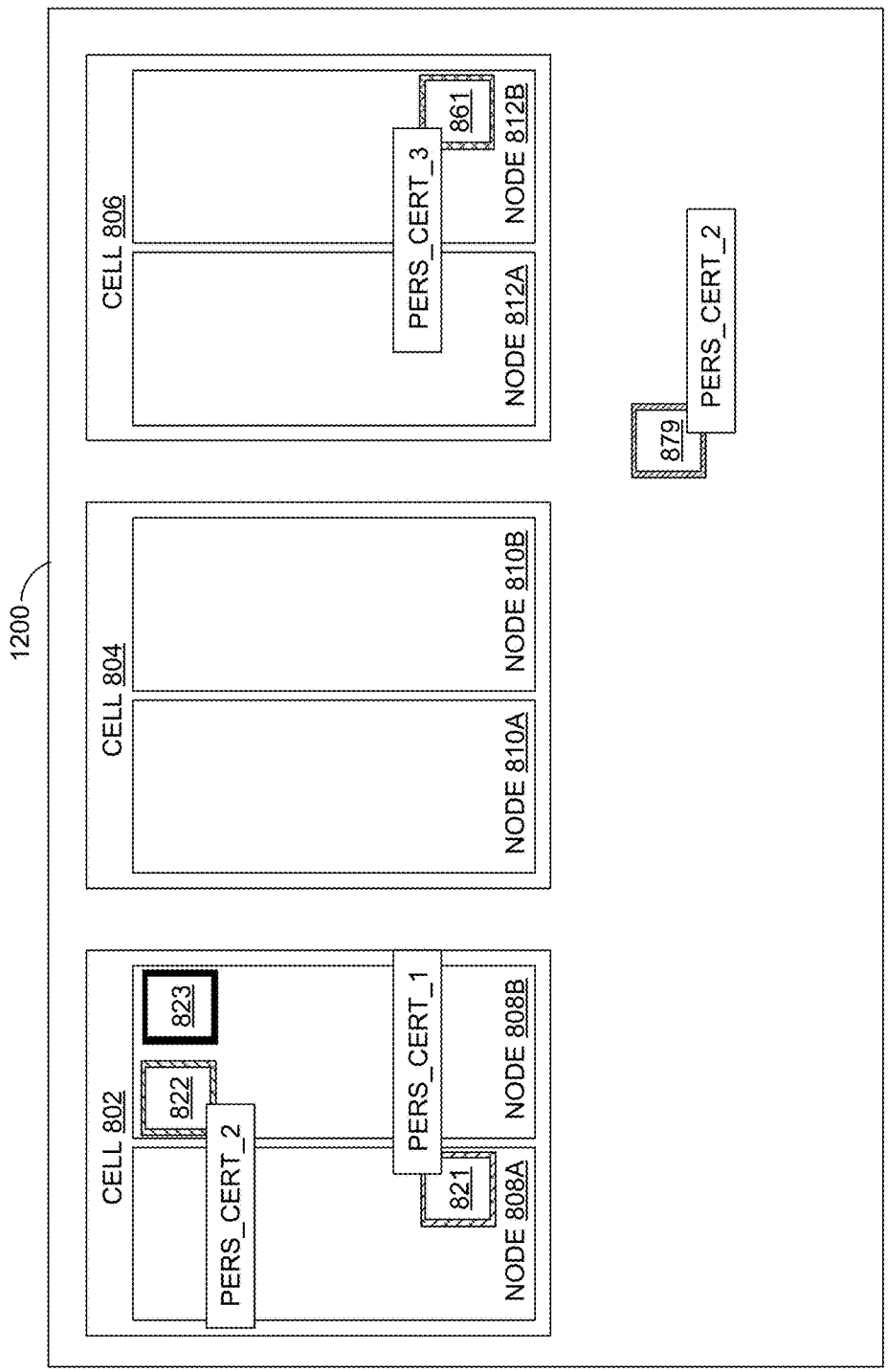
FIG. 12 depicts an alternative interactive map illustrating a plurality of application servers organized for administration into cells and nodes, and an external end-point device for which devices having a certificate relationship associated with a personal certificate of a first server are highlighted, according to various embodiments.

FIG. 12 depicts an alternative interactive map 1200 illustrating a plurality of application servers organized for administration into cells and nodes, and an external end point device for which devices having a certificate relationship associated with a personal certificate of a first server are highlighted, according to various embodiments. The map 1200 may be rendered on a display device in response to a user command to display a personal certificate mapping for a specified scope. In the example of FIG. 12, the scope is specified as server 823. In another scope, two or more servers can be specified. The server 823 has three personal certificates in its keystore. Locations where each of the personal certificates are stored and locations of corresponding signer certificates are displayed. A signer certificate corresponding with the first personal certificate (PERS_CERT_1) is stored in server 821. A second personal certificate (PERS_CERT_2) is stored in server 822 (in addition to server 823) and a signer certificate corresponding with the second personal certificate is stored in end point 879. The end point 879 may be outside of a managed computing environment. A signer certificate corresponding with the third personal certificate (PERS_CERT_3) is stored in server 861. In various embodiments, the specified scope may include a criteria, such as a certificate expiration criteria, in addition to a specification of one or more servers.

Figure 13:
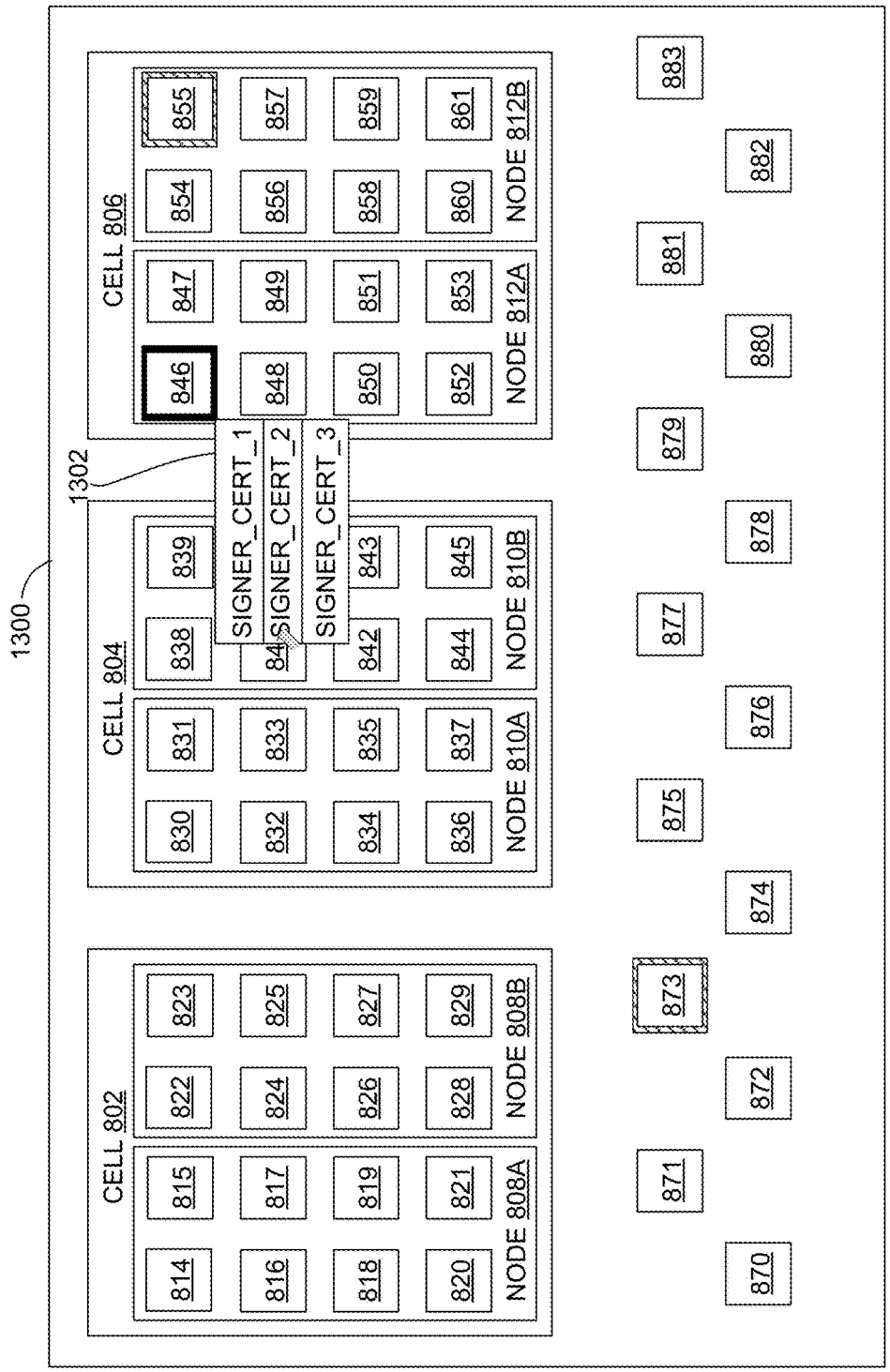
FIG. 13 depicts interactive map illustrating a plurality of application servers organized for administration into cells and nodes, and a plurality of external end-point devices for which devices having a certificate relationship associated with a signer certificate of a first server are highlighted, according to various embodiments.

FIG. 13 depicts interactive map 1300 illustrating a plurality of application servers organized for administration into cells and nodes, and a plurality of external end point devices for which devices having a certificate relationship associated with a signer certificate of a first server are highlighted, according to various embodiments. The map 1300 may be rendered on a display device in response to a user command to display a signer certificate mapping for a specified scope. The scope may be, for example, one or more servers. Once the map 1300 is rendered, a first user command can be used to select a particular application server. In response to the selection, a menu 1302 listing signer certificates stored in the truststore of the particular application server is displayed. In the example of FIG. 13, application server 846 has been selected by a user, as indicated by the solid line enclosing the icon for the server 846. The menu 1302 shows that application server 846 has three signer certificates in its truststore. A second user command can be used to select one of the signer certificates in the truststore. In response to the selection of one of the signer certificates, other locations where the signer certificate is stored and locations of corresponding personal certificates are highlighted. In the example of FIG. 13, the signer certificate is also stored in application server 855, which is highlighted, as indicated by the striped line enclosing the icon for the server 855. In addition, in this example, a corresponding personal certificate is stored in end point 873, and this locations is highlighted, as indicated by the solid lines enclosing the icons for the end point. In various embodiments, the specified scope may include a criteria, such as an expiration criteria, in addition to a specification of one or more servers. In an example, a user can specify a scope limited to application server 846 and a criteria of signer certificates nearing expiration. The user may learn that signer certificate two is nearing expiration and that the corresponding personal certificate is at an end point outside of the managed servers. Moreover, in response to this query, the user can learn that server 855 also has a certificate nearing expiration, i.e., certificate two, which corresponds with the same end point 873. The map 1300 and query results may be generated by a certificate visibility agent 222 using a query support file or data structure.

Figure 14:
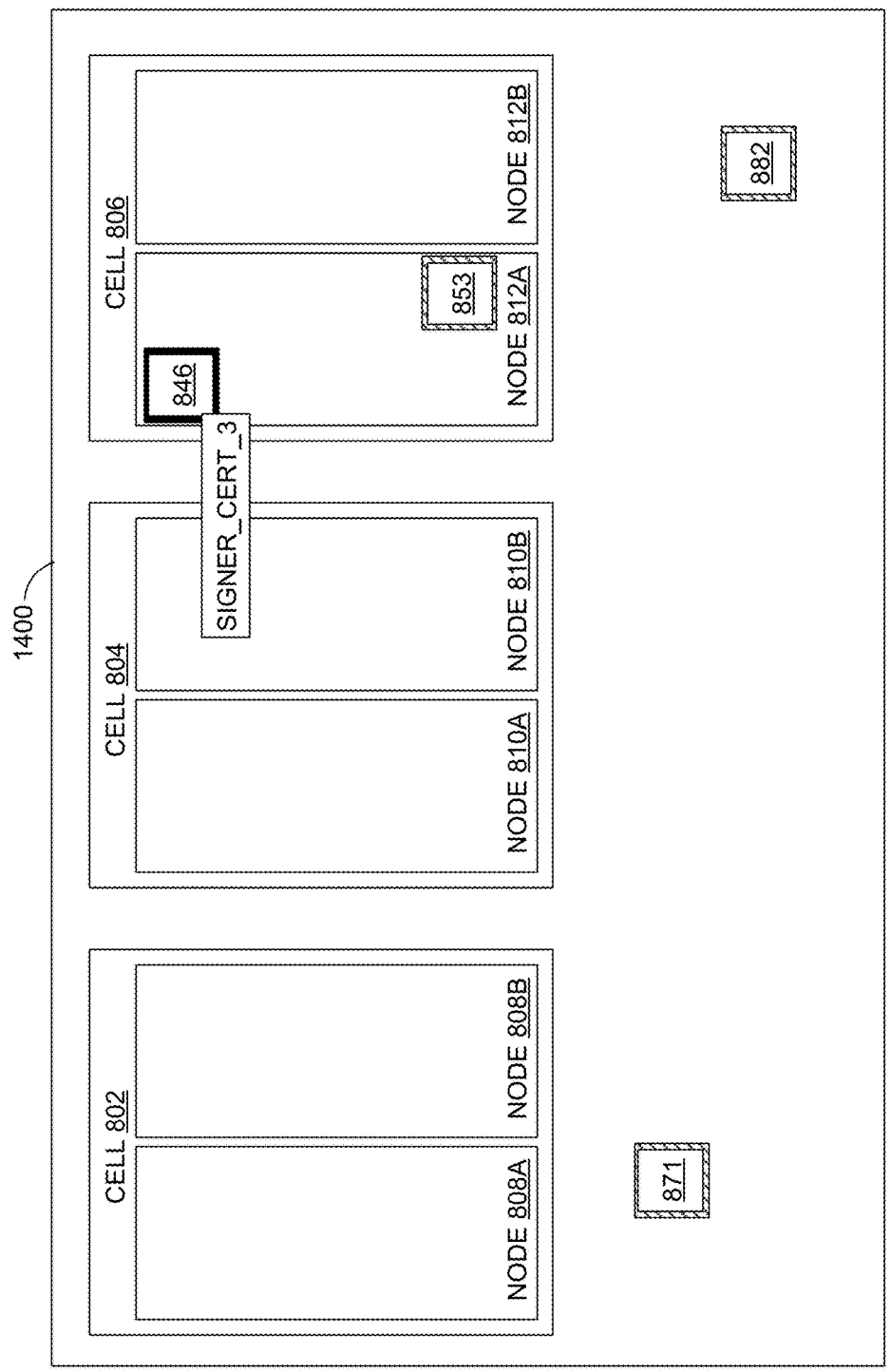
FIG. 14 depicts an alternative interactive map illustrating a plurality of application servers organized for administration into cells and nodes, and a plurality of external endpoint devices for which devices having a certificate relationship associated with a signer certificate of a first server are highlighted, according to various embodiments.

FIG. 14 depicts an alternative interactive map 1400 illustrating a plurality of application servers organized for administration into cells and nodes, and a plurality of external end-point devices for which devices having a certificate relationship associated with a signer certificate of a first server are highlighted, according to various embodiments. The map 1400 may be rendered on a display device in response to a user command to display a signer certificate mapping for a specified scope. As one example, the map 1400 may be rendered in response to a command to display a chain of signer certificates. In the example of FIG. 14, a scope specifies a chain of certificates for signer certificate three in the truststore of server 846, as indicated by the solid line enclosing the icon for the server 846. In alternative scopes, two or more servers may be specified. In the example of FIG. 14, intermediate signer certificates stored in servers 853 and 882 are displayed and highlighted, as indicated by the striped line enclosing the icons for these two servers. In addition, in this example, a root singer certificate is stored in end point 871, and this location is displayed and highlighted, as indicated by the striped line enclosing the icon for the end point 871. In various embodiments, the specified scope may include a criteria, such as an expiration criteria, in addition to a specification of a chain of certificates. In an example, a user can specify a scope limited to application server 846 and a criteria of signer certificates in a chain nearing expiration. The map 1400 and query results may be generated by a certificate visibility agent 222 using a query support file or data structure.

In various embodiments, icons can be highlighted on a map in any suitable manner, such as with different colors, different levels of brightness, different sizes, different pattern, different design of icon, and the like. As one example, where there are two or more servers that are both within a scope that includes a certificate expiration criteria, the two or more servers, alone or together with their correspondents, can be simultaneously displayed without showing servers that fail to meet the criteria. A different color may be used for each of the two or more servers and its correspondents that satisfy the criteria.

As noted, a user input for using interactive map 900 can be a roll over, click, or other similar input using a pointing device. Similarly, a user "input," "selection," or "command" for any of the example interactive maps shown in FIGS. 8-14 can be a roll over, click, or other similar input.

Figure 15:
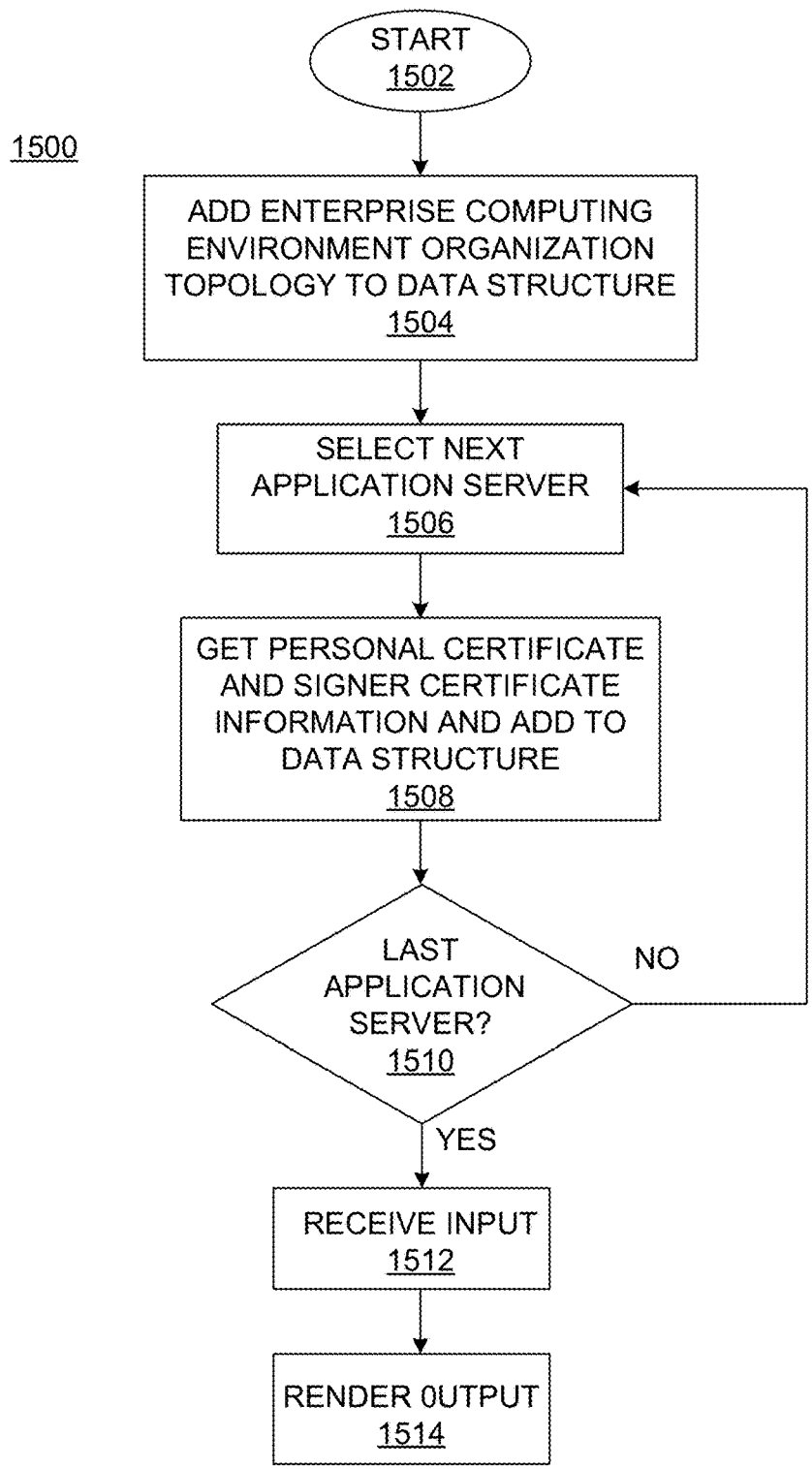
FIG. 15 is flow diagram of a process according to various embodiments.

FIG. 15 is flow diagram of a process 1500 according to various embodiments. The process 1500 can be performed by a certificate visibility agent 222 in various embodiments. In operation 1502, the process 1500 starts. In operation 1504, a query support file or data structure is created. The query support file or data structure can be used to support various queries related to displaying various maps showing application servers and correspondents of the servers. FIG. 6 shows one example of a topology and organization for a managed group of servers. In operation 1504, an organization or topology such as that shown in FIG. 6 is added to the query support data structure. The organization or topology may be obtained, for example, from a middleware software application for managing a distributed application supported by an enterprise network of computer systems.

Operations 1506 to 1510 iteratively locate and obtain personal and signer certificate information for each application server within a specified scope. In operation 1506, a next application server within a scope is selected, which may be the first server if the process is just starting. In some embodiments, the scope can be a user specified group of servers. In other embodiments, the scope can be all of the application servers in a managed network of computer systems, or other suitable scopes, such as those described herein. In operation 1508, personal certificate information, signer certificate information, or both is obtained for the selected server. The personal and signer certificates may be those located in the respective keystores and truststores of the application server. Alternatively, the personal and signer certificates may be those located with a deployment manager. Any type of information included in the personal and signer certificates that could be useful or necessary for various queries related to displaying maps showing how application servers are organized and the locations of digital certificate correspondents may be obtained. For example, the identity of correspondents, expiration dates of public keys, private keys, and digital certificates. In addition, in operation 1508, the personal and signer certificate information is added to the query support data structure. In operation 1510, a determination is made as to whether there are additional servers to process.

In operation 1512, a user input can be received. A first user input may specify a particular query. For example, the query can request an overall picture or map of all or a portion of an enterprise computing environment, such as the one shown in FIG. 8. A query can request a map certificates that have expired or are nearing expiration, such as the ones shown in FIG. 9 or 10. A query can request a personal certificate mapping, such as the ones shown in FIGS. 11 and 12. Additionally, a query can request a signer certificate mapping, such as the ones shown in FIGS. 13 and 14. In operation 1514, results of the query, e.g., a map, can be displayed. The results may be generated by a certificate visibility agent 222 using the query support file or data structure. In addition, a user may interact with the displayed query results as described above, such as by clicking on an icon to display a list of certificates for a server or to renew certificates. The user interaction may be supported by the certificate visibility agent 222.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of embodiments of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of embodiments of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A computer system for displaying an interactive graphical map of certificate relationships for one or more cells, each cell including one or more compute nodes, each node including one or more servers, comprising:
   a processor; and
   a memory communicatively coupled with the processor, wherein the memory includes a certificate visibility agent to perform operations comprising:
   retrieving certificate information for a plurality of servers within the one or more cells and storing the retrieved certificate information in the memory;

receiving an organization specification describing an organization structure for the plurality of servers;

receiving a command to generate the interactive graphical map of certificate relationships, the interactive graphical map including visual elements, wherein the visual elements include interactive icons, and the command including a command scope that identifies a certificate expiration date criteria;

identifying at least two servers having certificates satisfying the certificate expiration date criteria;

generating the interactive graphical map from the retrieved certificate information and rendering the interactive graphical map on a display device, the interactive graphical map simultaneously indicating:

the at least two servers having certificates satisfying the certificate expiration date criteria, wherein interactive icons that represent each of the at least two servers are highlighted, and arranged on the interactive graphical map according to the organization specification; and one or more devices, each device having a certificate relationship with a first server from the at least two servers, wherein interactive icons that represent the one or more devices are highlighted in response to a user selection of a highlighted interactive icon that represents the first server; and receiving, on the interactive graphical map, an input command for certificate replacement for the at least two servers; and causing, in response to input command, a replacement certificate to be generated and issued to said at least two servers to satisfy the certification expiration date criteria.

2. The computer system of claim 1, wherein at least one of the one or more devices is a correspondent device that has the certificate relationship with the first server when the first server accepts a public key of the correspondent device.

3. The computer system of claim 1, wherein at least one of the one or more devices is a correspondent device that has the certificate relationship with the first server when the correspondent device accepts a public key of the first server.

4. The computer system of claim 1, wherein at least one of the one or more devices is a certificate authority device that has the certificate relationship with the first server when the certificate authority device issues a certificate for a public key of the first server.

5. The computer system of claim 1, wherein at least one of the one or more devices is a certificate authority device that has the certificate relationship with the first server when the certificate authority device issues a certificate for a public key of a correspondent device that the first server accepts.

6. The computer system of claim 1, wherein the at least one of the one or more devices is external to the one or more cells.

7. The computer system of claim 1, wherein both the interactive icons that represent the at least two servers and the interactive icons that represent the one or more devices are highlighted on the interactive graphical map.

8. A computer program product including a non-transitory computer readable storage medium having computer readable program instructions stored thereon for causing a processor to perform operations for displaying an interactive graphical map of certificate relationships, the operations comprising:

retrieving certificate information for a plurality of servers, and storing the retrieved certificate information in a memory;

receiving an organization specification describing an organization structure that includes the plurality of servers, the organization specification specifying one or more cells, each cell including one or more compute nodes, each node including one or more servers;

receiving a command to generate the interactive graphical map of certificate relationships, the interactive graphical map including visual elements, wherein the visual elements include colors, patterns, and interactive icons, and the command including a command scope that identifies a certificate expiration date criteria;

identifying at least two servers having certificates satisfying the certificate expiration date criteria;

generating the interactive graphical map from the retrieved certificate information and rendering the interactive graphical map on a display device, the interactive graphical map simultaneously indicating:

the at least two servers having certificates satisfying the certificate expiration date criteria, wherein interactive icons that represent each of the at least two servers are highlighted;

one or more correspondent devices, each correspondent device having a certificate relationship with a first server from the at least two servers, wherein interactive icons that represent the one or more correspondent devices are highlighted, and arranged on the interactive graphical map according to the organization specification, in response to a user selection of a highlighted interactive icon that represents the first server; and one or more certificate authority devices, each certificate authority device having a certificate relationship with the first server, wherein interactive icons that represent the one or more certificate authority devices are highlighted in response to the user selection of the highlighted interactive icon that represents the first server; and providing, on the interactive graphical map, an input command for causing a replacement certificate to be generated for at least one of the at least two servers, receiving, on the interactive graphical map, an input command for certificate replacement for the at least two servers; and causing, in response to input command, a replacement certificate to be generated and issued to said at least two servers to satisfy the certification expiration date criteria.

9. The computer program product of claim 8, wherein the interactive graphical map shows one of a signer certificate relationship of the first server and a personal certificate relationship of the first server.

10. The computer program product of claim 8, wherein the command includes a first command to select the first server and a second command to select a particular certificate stored in the first server.

11. A computer system for displaying an interactive graphical map of certificate relationships for one or more cells, each cell including one or more computer nodes, each node including one or more servers, comprising:

a processor; and a memory communicatively coupled with the processor, wherein the memory includes a certificate visibility agent to perform operations comprising:

retrieving certificate information for a plurality of servers within the one or more cells and storing the retrieved certificate information in the memory;

receiving a command to generate the interactive graphical map of certificate relationships, the interactive graphical map including visual elements, wherein the visual elements include interactive icons, and the command including a command scope that identifies a certificate expiration date criteria;

identifying at least two servers having certificates satisfying the certificate expiration date criteria;

generating the interactive graphical map from the retrieved certificate information, and rendering the interactive graphical map on a display device, the interactive graphical map simultaneously indicating:

the at least two servers having certificates satisfying the certificate expiration date criteria, wherein interactive icons that represent the at least two servers are highlighted on the interactive graphical map; and one or more certificate authority devices external to the one or more cells, each of the one or more certificate authority devices having a certificate relationship with a first server from the at least two servers when the one or more certificate authority devices issue certificates for a public key of the first server, and wherein interactive icons that represent each of the one or more certificate authority devices are highlighted in response to a user selection of a highlighted interactive icon that represents the first server; and receiving, on the interactive graphical map, an input command for certificate replacement for the at least two servers; and causing, in response to input command, a replacement certificate to be generated and issued to said at least two servers to satisfy the certification expiration date criteria.

* * * * *